United States Patent
Muehl et al.

(10) Patent No.: US 7,480,708 B2
(45) Date of Patent: Jan. 20, 2009

(54) METHOD AND COMPUTER PROGRAM PRODUCT FOR MANAGING DATA CONSISTENCY

(75) Inventors: Gordon Muehl, Oestringen (DE); Klaus Irle, Walldorf (DE)

(73) Assignee: SAP AG, Walldorf (DE)

( * ) Notice: Subject to any disclaimer, the term of this patent is extended or adjusted under 35 U.S.C. 154(b) by 804 days.

(21) Appl. No.: 10/328,737

(22) Filed: Dec. 23, 2002

(65) Prior Publication Data

US 2004/0122927 A1    Jun. 24, 2004

(51) Int. Cl.
*G06F 15/173* (2006.01)
(52) U.S. Cl. .................. 709/223; 709/225; 707/100; 707/205; 713/200; 713/182
(58) Field of Classification Search .............. 709/223, 709/225; 707/100, 205; 713/200, 182
See application file for complete search history.

(56) References Cited

U.S. PATENT DOCUMENTS

| | | | |
|---|---|---|---|
| 6,768,995 B2 * | 7/2004 | Thier et al. | 707/100 |
| 6,944,662 B2 * | 9/2005 | Devine et al. | 709/225 |
| 6,985,905 B2 * | 1/2006 | Prompt et al. | 707/102 |
| 6,993,657 B1 * | 1/2006 | Renner et al. | 713/182 |
| 2002/0103818 A1 * | 8/2002 | Amberden | 707/205 |

OTHER PUBLICATIONS

Brodsky, Dmitry, et al., "Using File-Grain Connectivity to Implement a Peer-to-Peer File System," Proceedings of the Symposium on Reliable Distributed Systems, Los Alamitos, CA: IEEE Comp. Soc~, Oct. 13, 2002, pp. 318-323, XP010632044.*
Brodsky, Dmitry, et al., "Using File-Grain Connectivity to Implement a Peer-to-Peer File System," *Proceedings of the Symposium on Reliable Distributed Systems*, Los Alamitos, CA: *IEEE Comp. Soc.*, Oct. 13, 2002, pp. 318-323, XP010632044.

* cited by examiner

*Primary Examiner*—Tonia L Dollinger
*Assistant Examiner*—Kyung H Shin
(74) *Attorney, Agent, or Firm*—Schwegman, Lundberg & Woessner, P.A.

(57) ABSTRACT

Methods and apparatus, including computer program products, for managing data consistency within a network of computer systems. The method includes, in a network, storing tables of level indicators and associated ownership entities in network systems, generating a data item in a first network system, associating the data item with one of the level indicators, and storing the level indicator with the generated data item.

14 Claims, 3 Drawing Sheets

METHOD AND COMPUTER PROGRAM PRODUCT FOR MANAGING DATA CONSISTENCY

BACKGROUND

The present invention relates to data processing by digital computer, and more particularly to managing data consistency.

In collaborative business processes, several different and separate computer based systems are typically involved, such as in Enterprise Resource Planning (ERP) systems. These systems communicate with each other using a network, thus forming a computer system landscape. Within such a system landscape data is exchanged between and replicated in the systems involved, and continual efforts are needed to maintain, for example, consistency of the data across each of the systems within the landscape.

SUMMARY

The present invention provides methods and apparatus, including computer program products, for managing data consistency.

In general, in one aspect, the invention features a method in a network including storing tables of level indicators and associated ownership entities in network systems, generating a data item in a first network system, associating the data item with one of the level indicators, and storing the level indicator with the generated data item.

The invention can be implemented to include one or more of the following advantageous features. Each network system can be a unique ownership entity.

The method can also include, in a second network system, requesting the generated data item from the first network system, receiving the data item and associated level indicator from the first network system, searching a lookup table stored in the second network system for the level indicator, and determining the ownership entity of the data items in response to the search.

In embodiments, the level indicators are metadata. The metadata can be tags and/or flags. Each of the level indicators can represent more than one network system. The level indicators can represent a hierarchy. Associating the data item can include a second one of the level indicators.

In general, in another aspect, the invention features an Enterprise Resource Planning (ERP) data structure including a data item, and metadata containing a level indicator.

The invention can be implemented to include one or more of the following advantageous features. The metadata can be a tag and/or a flag. The metadata can include a second level indicator. The level indicator maps to an ownership entity residing in a network of ERP systems.

The invention can be implemented to realize one or more of the following advantages.

Data that is generated and shared in a landscape includes a level indictor that can be used by systems in the landscape to map to one or more ownership entities.

The method supports system landscapes where there is no single or central system that contains all the data and where no single system contains all data consistency rules. Ownership indicators or Global Unique Identifiers can be used to represent the systems and their ownership within the landscape.

The details of one or more implementations of the invention are set forth in the accompanying drawings and the description below. Further features, aspects, and advantages of the invention will become apparent from the description, the drawings, and the claims.

DETAILED DESCRIPTION

Figure 1:
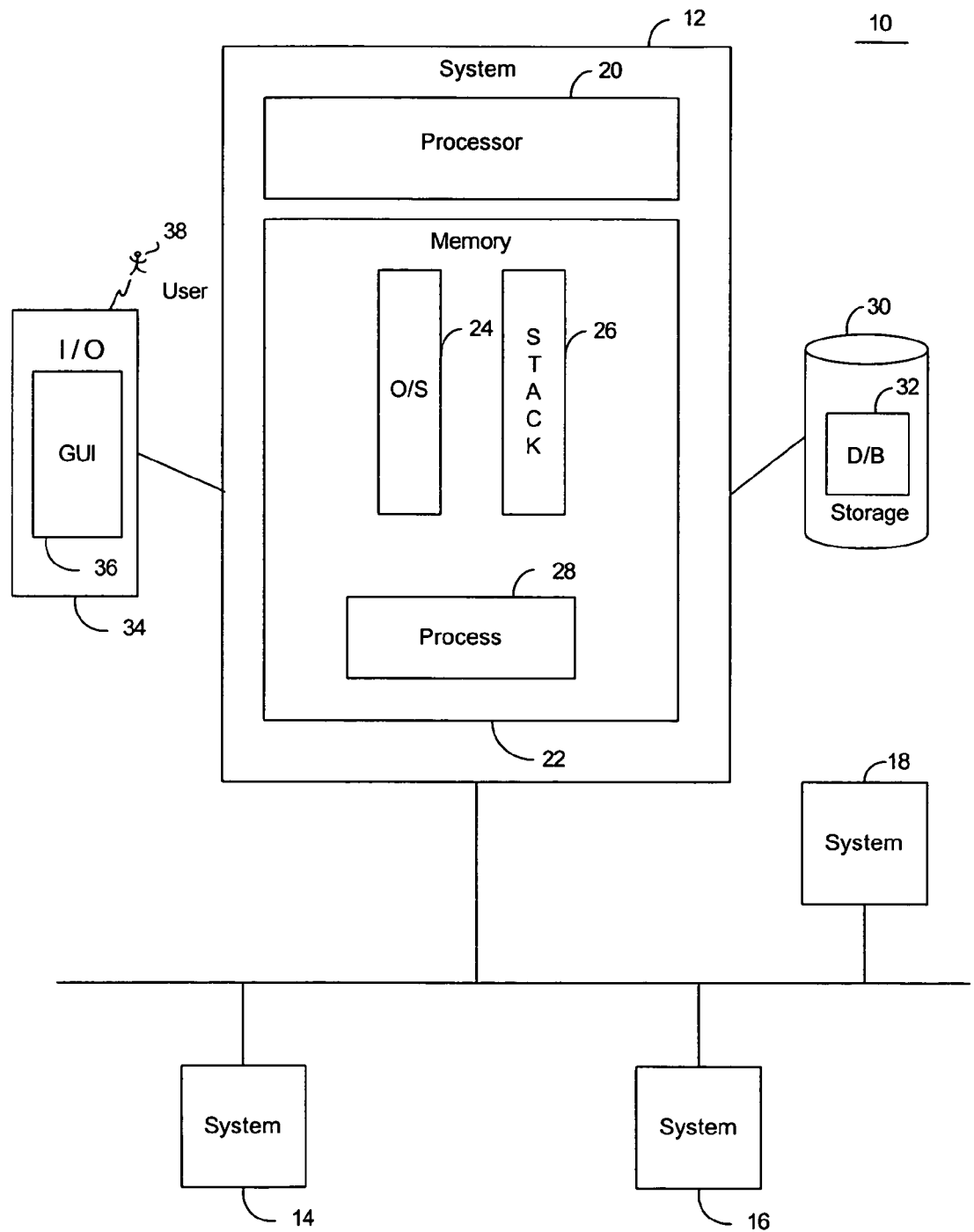
FIG. 1 is block diagram of a network.

In FIG. 1, an exemplary network 10, also referred to as a landscape, includes a number of collaborating systems 12, 14, 16, 18. Each of the systems 12, 14, 16, 18, system 12 for example, includes a processor 20 and a memory 22. Memory 22 stores an operating system 24, a stack 26 for communicating over the network 10, and machine executable instructions executed by the processor 20 to perform a collaborative business process 28.

Each of the systems 12, 14, 16, 18, system 12 for example, includes a storage device 30 having a database 32 that can be, for example, maintained by a database management system. System 12 can also include an input/output (I/O) device 34 for display of a Graphical User Interface (GUI) 36 to a user 38.

The systems 12,14,16,18 can be of any type, such as Enterprise Resource Planning (ERP) systems, for example. In general, ERP is an industry term for a broad set of activities supported by multi-module application software that helps a manufacturer or other business manage important parts of its business, including product planning, parts purchasing, maintaining inventories, interacting with suppliers, providing customer service, and tracking orders. ERP can also include application modules for finance and human resources aspects of a business. Typically, an ERP system uses or is integrated with a database management system.

An example of an ERP system is the integrated business solution mySAP.com from SAP AG. In an ERP system, business processes are modeled in business objects. Instances of the business object are represented in data generated, stored and manipulated by the system. Typically, the systems that form part of the landscape each include a database, as discussed above, in which data related to instances of the business objects are stored.

Each of the systems 12, 14, 16, 18 generates, maintains, utilizes and shares data within the landscape 10. Rather than one single master owner entity of each data item utilized within the landscape 10, there is the possibility that a data item has more than one owner entity. Each owner entity of a data item typically is responsible for maintaining the data item that the owner entity generates. Each data item is assigned to a hierarchical level number or level indicator of ownership entities. The assigned level number or level indicator is stored with the data item as metadata such as, for example, a tag or flag, and assigns responsibility of the data item to an owner entity, such as one of the systems 12, 14, 16, 18 within the landscape 10. Each system 12, 14, 16, 18 includes a mapping function or translation function that maps assigned level numbers or indicators to a respective owner entity.

In another example, Global Unique Identifiers (GUIDs) are used to represent systems and their ownership in place of level indicators and mapping functions. A GUID (global unique identifier) is a term used by Microsoft Corporation for a number that its programming generates to create a unique identity for an entity such as a Microsoft Word document. GUIDs are widely used in Microsoft products to identify interfaces, replica sets, records, and other objects. Different kinds of objects have different kinds of GUIDs. For example, a Microsoft Access database uses a 16-byte field to establish a unique identifier for replication. The GUID numbers generated for data can incorporate the unique identification number of a computer's card.

In a traditional client/server model of a network, one or more client systems obtain data from a centrally maintained database associated with a server system. In the traditional model, the server system maintains the data and the data is associated with the server system as its ownership entity. Here, rather than having many client systems and one server system in the landscape 10, the landscape 10 includes many systems 12, 14, 16, 18, each owning data and responsible for that data. Each system shares data with other systems in the landscape 10 that are not responsible for managing the shared data. Within the landscape 10, systems 12, 14, 16, 18 can be consumers of data, consumers and owners of data, and owners of data. By tagging the data there can occur sharing of data ownership between a number of users of the data.

Figure 2:
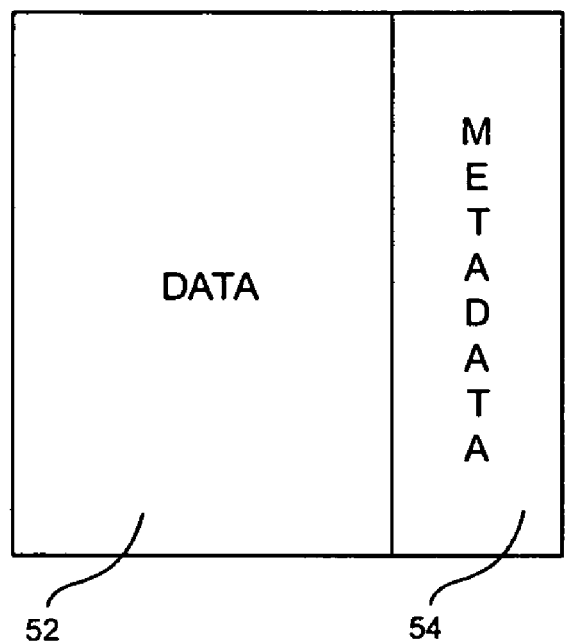
FIG. 2 is a block diagram of a data structure.

In FIG. 2, an exemplary data item 50 includes data 52 and a unique hierarchical level or indicator number 54. The number 54 is metadata and can be implemented as a tag or flag. The data 50 and associated number 54 are used in conjunction with a mapping function or translation function. Each of the systems 12, 14, 16 18 include this mapping function. In an example, the mapping function is a lookup process that loads the tag 54 associated with the data 50 and compares that tag 54 with a list or table of tags stored locally within the system 12, 14, 16, 18. The table of tags maps tags to ownership entities. If the tag 54 is found in the lookup table, its associated ownership entity is identified.

In another example, when a lookup table is modified by any one of the systems 12, 14, 16, 18 within the landscape 10, system 12 for example, the modification is sent to the other systems 14, 16, 18 within the landscape 10 as an update. The systems 14, 16, 18 receive the modification and update their respective local lookup tables.

Figure 3:
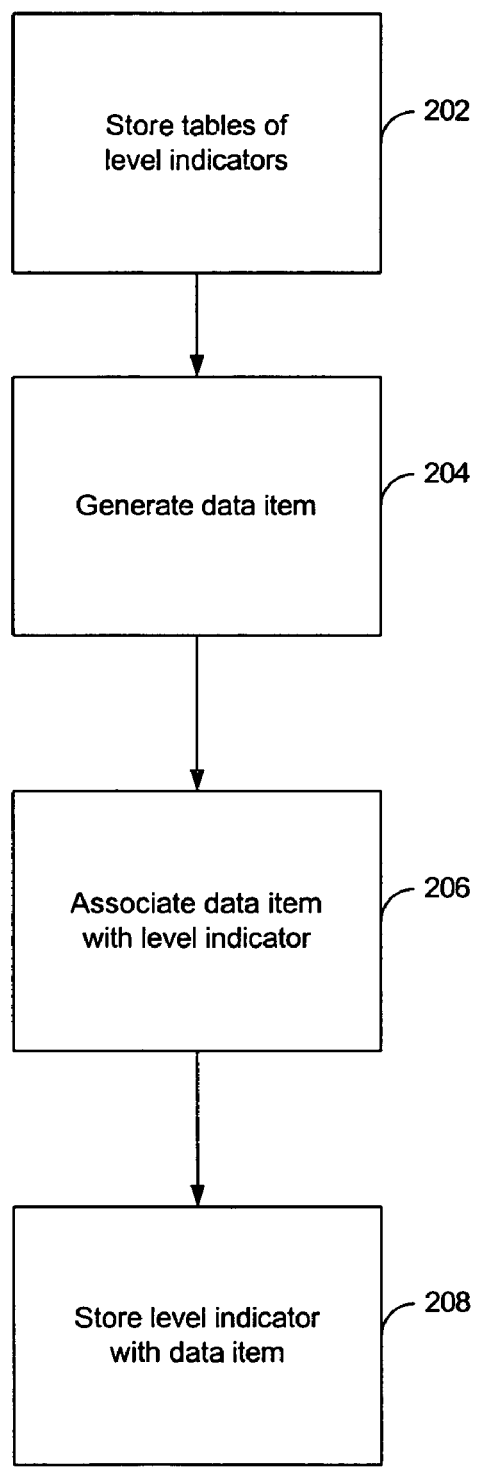
FIG. 3 is a flow diagram of a data indication process.
Like reference numbers and designations in the various drawings indicate like elements.

In FIG. 3, a data indication process 200 includes, in a network, storing (202) tables of level 10 indicators and associated ownership entities in network systems. The process 200 generates (204) a data item in a first network system and associates (206) the data item with one of the level indicators. The process 200 stores (208) the level indicator with the generated data item. Each level has a unique ownership assignment to one system.

The invention can be implemented in digital electronic circuitry, or in computer hardware, firmware, software, or in combinations of them. The invention can be implemented as a computer program product, i.e., a computer program tangibly embodied in an information carrier, e.g., in a machine-readable storage device, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the invention can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

The invention can be implemented in a computing system that includes a back-end component, e. g., as a data server, or that includes a middleware component, e. g., an application server, or that includes a front-end component, e.g., a client computer having a graphical user interface or a Web browser through which a user can interact with an implementation of the invention, or any combination of such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers and web services. A client and server are generally remote from each other and typically interact through a communication network. The relationship of client and server arises by virtue of computer programs running on the respective computers and having a client-server relationship to each other. Web services (sometimes called application services) are services (usually including some combination of programming and data, but possibly including human resources as well) that are made available from a business's Web server for Web users or other Web-connected programs. Providers of Web services are generally known as application service providers.

Web services range from such major services as storage management and customer relationship management (CRM) down to much more limited services such as the furnishing of a stock quote and the checking of bids for an auction item.

Users can access some Web services through a peer-to-peer arrangement rather than by going to a central server. Some services can communicate with other services and this exchange of procedures and data is generally enabled by a class of software known as middleware. Services previously possible only with the older standardized service known as Electronic Data Interchange (EDI) increasingly are likely to become Web services. Besides the standardization and wide availability to users and businesses of the Internet itself, Web services are also increasingly enabled by the use of the Extensible Markup Language (XML) as a means of standardizing data formats and exchanging data. XML is the foundation for the Web Services Description Language (WSDL).

The invention has been described in terms of particular embodiments. Other embodiments are within the scope of the following claims. For example, the steps of the invention can be performed in a different order and still achieve desirable results.

What is claimed is:

1. A method, performed by a first ownership entity that is in a first network system, the method comprising:
   storing a table that associates level indicators to ownership entities in one or more network systems;
   generating a data item and storing the data item in a first system of the one or more network systems;
   associating the data item with a first level indicator from the table, the first level indicator assigning ownership responsibility for the data item to the first ownership entity;
   storing the first level indicator in the first system as a tag with the data item; and
   associating the data item with a second level indicator and storing the second level indicator in the first system, the second level indicator assigning ownership responsibility for the data item to a second ownership entity;
   wherein the first and second level indicators assign hierarchical ownership responsibility for the data item to the first and second ownership entities.

2. The method of claim 1, wherein each of the first and second ownership entities comprises a network system.

3. The method of claim 1, further comprising:
   in a second network system, requesting the data item that was generated in the first network system;
   receiving the data item and level indicators associated with the data item from the first network system;
   searching a lookup table stored in the second network system for the level indicators associated with the data item; and
   determining ownership entities of the data item as a result of the search.

4. The method of claim 1, wherein the first and second level indicators comprise metadata.

5. The method of claim 1, wherein the first and second level indicators represent more than one network system.

6. The method of claim 1, wherein the one or more network systems include an Enterprise Resource Planning (ERP) system.

7. The method of claim 1, wherein each level indicator maps to an ownership entity residing in a network of ERP systems.

8. A computer program product, tangibly embodied in an information carrier, the computer program product being executable by one or more data processing apparatus in a first ownership entity in a first network system to:
   store a table that associates level indicators to ownership entities in one or more network systems;
   generate a data item and store the data item in a first system of the one or more network systems;
   associate the data item with a first level indicator from the table, the first level indicator assigning ownership responsibility for the data item the first ownership entity;
   store the first level indicator in the first system as a tag with the data item; and
   associate the data item with a second level indicator and store the second level indicator in the first system, the second level indicator assigning ownership responsibility for the data item to a second ownership entity;
   wherein the first and second level indicators assign hierarchical ownership responsibility for the data item to the first and second ownership entities.

9. The product of claim 8, further comprising instructions to:
   request a second data item that was generated in a second network system;
   receive the second data item and a level indicator associated with the second data item from the second network system;
   search the table for the level indicator associated with the second data item; and
   determine an ownership entity of the second data item as a result of the search.

10. The product of claim 8, wherein the first and second level indicators comprise metadata.

11. The product of claim 8, wherein the first and second level indicators represent more than one network system.

12. The product of claim 8, wherein the one or more network systems comprise an Enterprise Resource Planning (ERP) system.

13. The product of claim 8, wherein each level indicator maps to an ownership entity residing in a network of ERP systems.

14. The product of claim 8, wherein each ownership entity comprises a network system.

* * * * *